May 12, 1959 R. HALFTERMEYER 2,886,330

MAGNETIC DUPLICATE SOUND RECORD

Filed Nov. 23, 1954

2,886,330
Patented May 12, 1959

2,886,330

MAGNETIC DUPLICATE SOUND RECORD

René Halftermeyer, Montreuil-sous-Bois, France

Application November 23, 1954, Serial No. 470,751
Claims priority, application France November 25, 1953
4 Claims. (Cl. 274—41.4)

My invention relates to magnetic duplicate sound recording and reproducing units for simultaneously producing a master recording on a main record and copy recordings on sheets or films acting as a duplicate record for said main record by means of any magnetic machine having the usual turn-table and drive means for rotatingly driving said unit and operatively cooperating with a tone head. In my invention said unit generally includes a relatively rigid main magnetic record having two magnetically separate recording faces and a cover or enclosing covering for closely accommodating said record, said cover comprising two relatively flaccid sheets for producing duplicates of the two faces of said main record, respectively.

It is also an object of my invention to provide means for preventing any undesirable relative displacement of said duplicates and main record as well as the tearing and puckering of said duplicates by said tone head, the erasing head or any other device operatively in contact with said duplicates, more particularly in their outermost portions when said unit is being driven in rotation.

The man record is conveniently given a polygonal shape two sides of which being preferably parallel to each other. The two sheets or films of magnetic material of the duplicate record are joined along their edges or peripheries with the exception of opposed portions of said peripheries defining an opening for the free sliding of said main record therethrough, up to a single definite abutting relative position, with the whole surface of said sheets fully restored to their original flatness necessary for correct recording thereon or play-back therefrom.

Such a novel and improved construction provides a compact assembly made of three interdependent elements in intimate contact with each other by their opposed faces and tightly yet removably interconnected on their sides; any undesirable relative displacements of same by sliding or otherwise are, therefore, positively prevented, with the result that the risks of tearing and puckering the duplicates, more particularly in the outermost portions of their outer faces, e.g. by the tone head—a serious disadvantage frequently observed with the previously known independent record duplicates of circular shape—are positively avoided.

Obviously, my improved duplicate unit further comprises means for centering it on the magnetic plate of a reproducing machine as well as means for driving said unit into rotation.

For a more complete understanding of my invention, reference should be had to the accompanying drawing which, by means of illustration only, shows an exemplary embodiment of said invention for supporting the description of same given hereinafter.

Figure 1:
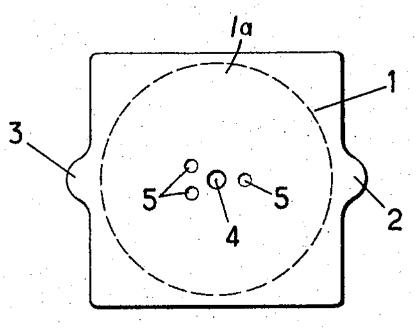
Fig. 1 is a top view of the above described main record out of its duplicate cover.

Referring to the drawing, the main record 1, which may be made of any suitable relatively rigid substance incorporating a zone 1*a* of magnetic material, is shown as being square in shape and provided with registering means such as the two lugs 2 and 3 on opposite sides thereof for mating with complementary registering means on the duplicate record. In its central portion, said record is provided with one opening or centering hole 4 and three other openings 5 for engaging suitable driving pins (not shown) carried by the turntable of the recording and reproducing machine; it will be understood that such centering and driving means might be of any other suitable types.

Figures 2, 3:
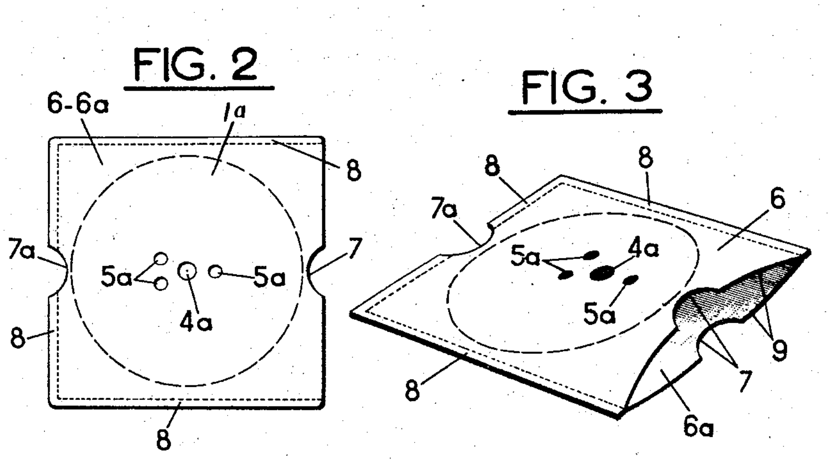
Fig. 2 shows the cover.
Fig. 3 is a perspective view of said duplicate cover in opened position to receive said main record to be accommodated therein.

As above mentioned, the duplicate record of my invention is intended to act as a cover internally accommodating the above described main record, and it comprises, as shown in Figs. 2 and 3, two sheets or films 6, 6*a* with registering means such as cut out portions 7, 7*a* and secured to each other at 8, for instance by gluing, along three peripheral edges thereof, with the fourth edge free (Fig. 3) so as to define an opening 9 for the main record to pass therethrough. The said sheets or films 6, 6*a* should be made of a flaccid substance such as paper or plastic material and rendered magnetic, for instance by incorporating one or more metal oxydes therein for example at 1*a*.

Figure 4:
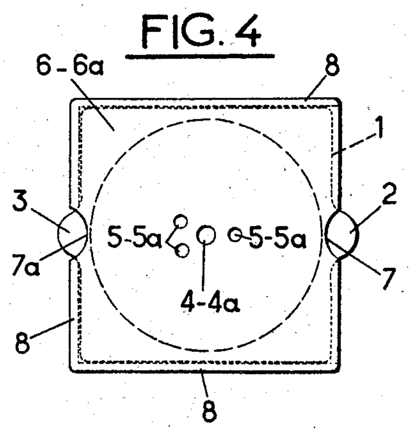
Fig. 4 shows the whole unit ready for utilization.

Whenever the record 1 has been positioned within the duplicate cover 6, 6*a*, as shown in Fig. 4, the lugs 2 and 3 register with the cut-out positioning portions 7, 7*a* and the openings 4, 4*a* and 5 are centered with precision, the assembly thus formed being then ready for utilization.

Thus, the separable covering may constitute the original copy record to be mailed to a correspondent, as an ordinary letter, and the separable disc may constitute a master copy record kept on file or stored by the sender.

Obviously, while I have shown and described a particular embodiment of my invention, it will be understood that I do not wish to be limited thereto since many modifications may be made and I therefore contemplate by the appended claims to cover any such modifications as fall within the true spirit and scope of my invention.

Particularly, the main record 1 may comprise a single registering lug and, for some applications of the invention, said record may be provided with other registering means. The same may be said of the cut-out portions 7, 7*a*.

With regard to the main record 1 and its duplicate cover 6, 6*a*, these may be given, instead of a square shape, any other suitable polygonal shape including sides extending in a direction adapted to prevent any relative displacement between said sheets or films 6, 6*a* and said main record 1 and further to inherently provide the desired centering of such constitutive parts of the assembly.

Whatever preferred form embodies the present invention, the duplicate sheets peripherally remain in intimate contact with the main record and, therefore, they are never exposed to be torn or otherwise damaged by the tone head, the erasing head or any other device operatively in contact with said sheets, such positive result being the main object of my invention.

I claim as my invention:

1. A recording disc unit, for simultaneously and magnetically producing essentially identical recordings on separable main and duplicate magnetic disc records, respectively, said unit comprising an outer disc support and magnetic duplicate recording assembly, forming an enclosing covering including two inherently flaccid sheets, integral with each other, with at least one of said sheets having magnetizable material incorporated therein, and having substantially polygonal innermost edge portions, the latter forming innermost position means, a separable relatively more rigid inner disc support and magnetic main recording assembly, defining two substantially flat outer faces having at least substantially polygonal outermost edge portions cooperating with said outer faces for respectively defining sheet flattening means and outermost positioning means, with magnetizable material on each outer face of said main assembly to be recordingly associatable with each corresponding sheet having magnetizable material, said inner flat main assembly being slidably and fittingly insertable into said duplicate assembly covering for tightly applying said outer duplicate sheets and thereby holding flat the same when simultaneously and magnetically producing both essentially identical recordings, said outer and inner assemblies comprising spaced drive means alignable for recording said records and playing back the same.

2. For the separate playing back of a recording recorded on a flaccid sheet record covering according to claim 1, a flat insert member substantially having body strength, design and size characteristics rendering said insert member sufficiently rigid to flatten and hold flat said duplicate sheet record covering when fittingly and slidably inserted into and positioned within the same.

3. A recording disc unit according to claim 1, wherein said spaced driving means are located at the vertices of an isosceles triangle of medium size the main axis of which is parallel with the axis of symmetry of said unit and thereby cooperate with said positioning means and said flattening means for positively preventing any free movement between said main and duplicate disc records.

4. A recording disc unit comprising one inner main recording disc member having a polygonal outer contour and a given cumulative diametral size and thickness and having magnetically separate outer magnetisable faces with preferential magnetisable regions on its respective sides, and a pair of outer recording disc elements embodied at least in preferential magnetisable portions of a pair of light sheets juxtaposed and laterally joined as to form an envelope for accommodating said disc member and having a polygonal inner contour fittingly complementary of said polygonal outer contour and a similarly cumulative diametral size substantially equal to said cumulative diametral size of said disc member, said envelope enclosing said main disc member on all sides but one thereby leaving an opening of an extent at least equal to said substantially equal cumulative diametral sizes for slidingly inserting said main disc member into said envelope to cause respectvely both polygonal contours to register laterally with each other in a single definite relative abutting position, and simultaneously to cause said light sheets to be tightly applied against said main disc member particularly at the outermost regions thereof, with said preferential magnetisable regions registering with said preferential magnetisable portions in a single definite flat contact position ready for simultaneously recording a number not greater than two pairs of mutually identical recordings on at least one side of said envelope and on one corresponding side of said main disc member respectively, and spaced drive means alignable for simultaneously recording said records, whereby said main disc member and said envelope may be thereafter separated from each other for separately playing back each of said identical records.

References Cited in the file of this patent

UNITED STATES PATENTS

| | | |
|---|---|---|
| 2,225,048 | Hasin | Dec. 17, 1940 |
| 2,309,276 | Roberts | Jan. 26, 1943 |
| 2,594,893 | Faus | Apr. 29, 1952 |
| 2,672,346 | Roberts | Mar. 16, 1954 |

OTHER REFERENCES

Publication, "Duplicating Magnetic Tape by Contact Printing," By M. Camras, pages 78–83, of Electronics Magazine, December 1949.